Nov. 29, 1960
A. H. STANTON ET AL
2,961,900
WORK HOLDING CLAMP
Filed March 5, 1959
2 Sheets-Sheet 1
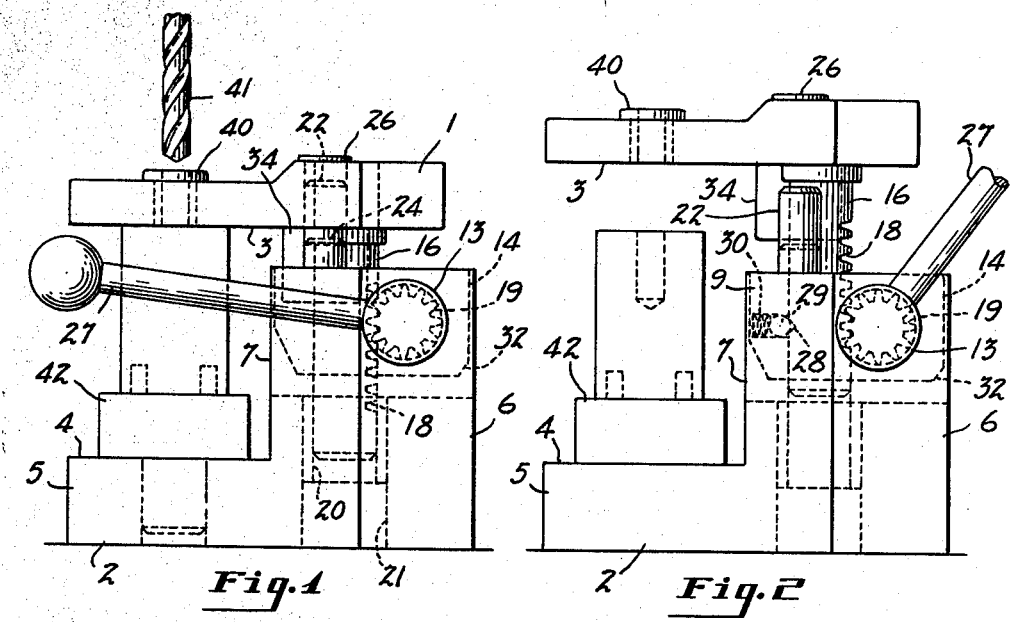
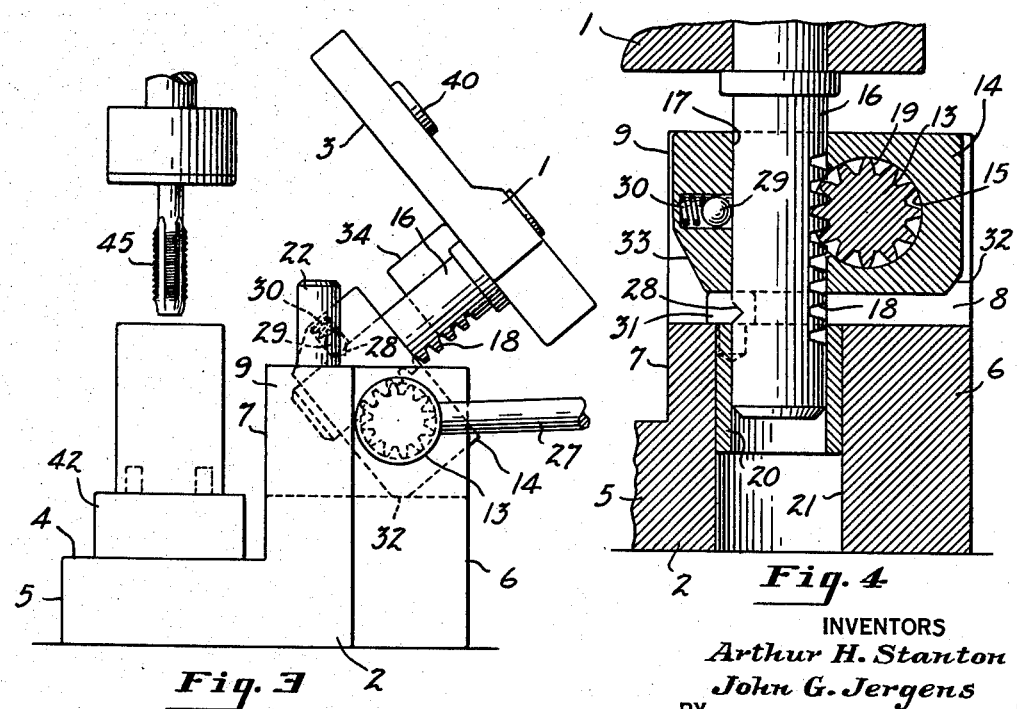
INVENTORS
Arthur H. Stanton
John G. Jergens
BY
ATTORNEYS Nov. 29, 1960   A. H. STANTON ET AL   2,961,900
WORK HOLDING CLAMP Filed March 5, 1959   2 Sheets-Sheet 2

INVENTORS
Arthur H. Stanton
John G. Jergens
BY
ATTORNEYS

United States Patent Office 2,961,900
Patented Nov. 29, 1960

2,961,900
WORK HOLDING CLAMP

Arthur Howard Stanton, Hookhollow Road, Novelty, Ohio, and John G. Jergens, 18107 Invermere Ave., Shaker Heights, Ohio Filed Mar. 5, 1959, Ser. No. 797,431

14 Claims. (Cl. 77—62)

This invention relates to work holding clamps and more particularly to clamps suitable for use as a work holding jig or fixture for holding a workpiece in position to be acted upon by a machine tool.

The clamp of the present invention has clamping members which have relatively linear closing or opening movements while their clamping faces are separated less than a predetermined distance and relative swinging movements when the clamping faces are separated a distance greater than said predetermined distance, so that one clamping member can be moved to a position laterally clear of the clamping face of the other member to facilitate the placing of a workpiece in the clamp, the removal of a workpiece from the clamp and the proper positioning of the workpiece in the clamp.

The clamp preferably comprises a lower stationary clamping member and an upper movable clamping member that is guided vertically into and out of clamping position but which, after it has been moved vertically a predetermined distance, is swung laterally about a horizontal axis to a position laterally clear of the lower clamping face to afford free access to positioning portions of the clamp.

The guiding means is preferably in the form of a pin or post attached to one of the clamping members and having a sliding fit in the guide socket in the other clamping member, the length of the guide pin or post being such that it is disengaged from its socket after a movement that separates the clamping faces a predetermined distance.

The upper clamping member is preferably swung laterally automatically upon continued movement of the actuator in a direction to lift the upper clamping member. The upper clamping member is guided in a member that is pivoted to a horizontal actuating shaft that is connected to the upper clamping member to move it vertically in the pivoted guide member. Additional guides constrain the upper clamping member to vertical movement for a predetermined distance sufficient to clamp or release the workpiece, the guiding means being disengaged after a predetermined upward movement of the upper clamping member. Means is provided for stopping the sliding movement of the upper clamping member in the pivoted guide member after said clamping member is disengaged from said additional guiding means, so that further turning movement of the actuating shaft in the direction in which it is turned to lift the upper clamping member will cause the upper clamping member to swing bodily about the axis of the shaft in a rearward direction, this movement being continued until the upper clamping member is in a position laterally clear of the positioning faces of the lower clamping member.

The invention has for its object to provide a work holding clamp which affords free access to the workpiece before and after clamping, so that accurate positioning of the workpiece with respect to the clamping members is facilitated and so that the work can be inspected or have additional operations performed thereon before removal from the support.

Reference should be had to the accompanying drawings forming part of this specification, in which:

Figure 1 is a side elevation of a work holding clamp embodying the invention, showing the same in clamping position;

Fig. 2 is a side elevation showing the upper clamping member shifted out of engagement with the work;

Fig. 3 is a side elevation showing the upper clamping member swung rearwardly to a position clear of the work;

Fig. 4 is a fragmentary central vertical section showing the combined guide post and rack and the actuating gear in mesh with the rack;

Figure 5:
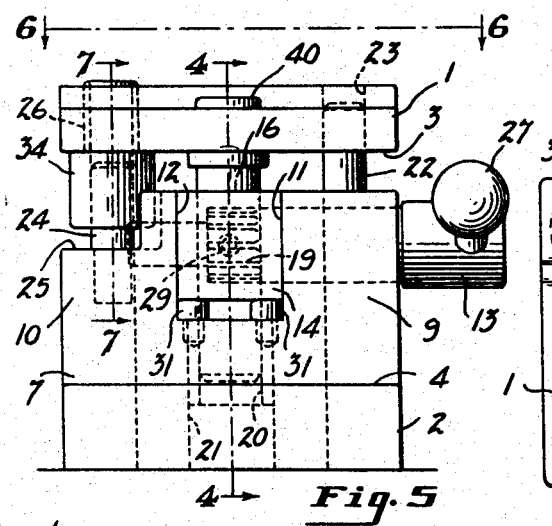
Fig. 5 is a front elevation of the clamp.
Figure 6:
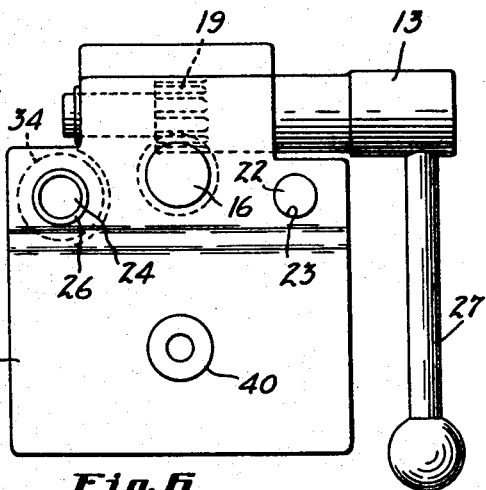
Fig. 6 is a top plan view of the clamp viewed as indicated at 6—6 in Fig. 5.

Referring to the accompanying drawings, the clamp of the present invention has relatively movable clamping members 1 and 2 provided with opposed clamping faces 3 and 4. As herein illustrated, the clamping member 1 is movably mounted on the lower clamping member 2 and has a horizontal clamping face 3 that overlies the clamping face 4 of the lower clamping member. The clamping face 4 of the lower clamping member is formed on a forwardly extending base portion 5 and the clamping member 1 is mounted upon an upright rear portion 6 of the lower clamping member that is disposed rearwardly of the clamping face 4. The upright portion 6 has a vertical front face 7 against which a workpiece may be positioned and is provided with a rectangular channel 8 which extends from the front to the rear thereof substantially midway between the sides of the upright portion to provide spaced uprights 9 and 10 on opposite sides of the channel, the uprights 9 and 10 having parallel inner vertical faces 11 and 12 that form the side walls of the channel 8. A horizontal shaft 13 is journaled in the uprights 9 and 10 and extends across the channel 8 at right angles to the walls 11 and 12. The shaft 13 is spaced above the bottom of the channel and supports a guide member 14 that fits between the walls 11 and 12 and that has a transverse bore 15 in which the shaft 13 fits, the guide member 14 being thus pivotally mounted on the shaft 13. A guide post 16 fixed to the upper clamping member 1 rearwardly of its clamping face 3 slidably fits in a bore 17 extending through the guide member 14 at right angles to the bore 15 and forwardly thereof. The guide post 16 has a longitudinal rack 18 on its rear side that meshes with a gear 19 cut in the shaft 13. The post 16 is of a length to extend through the guide member 14 and into a guide bushing 20 mounted in a bore 21 below the channel 8. The post 16 is preferably of cylindrical form and the teeth of the rack 18 are formed by cutting transverse grooves across an arc of the cylinder.

The rack 18 is of a length such that the post 16 can be moved vertically by the gear 19 far enough to disengage its lower end from the bushing 20. When the gear 19 reaches the lower end of the rack 18 the post 16 is locked against further vertical movement in the guide member 14 and further turning movement of the gear 19 in a direction to lift the upper clamping member, swings the guide member 14, the post 16 and clamping member 1 rearwardly about the axis of the shaft 13.

The post 16 and the bushing 20 which forms a guide socket in the lower clamping member constrain the upper clamping member to linear movement in a vertical direction while the post 16 is engaged in the bushing 20 and disengagement of the post 16 from the bushing 20 leaves the post and upper clamping member free to turn with the shaft 13. In order to prevent torsional thrusts on the cylindrical post 16, additional guiding means disposed on opposite sides of the post 16 may be provided between the clamping members.

A short vertical post 22 fixed to the top of the upright 9 engages in a guide socket 23 in the upper clamping member 1 and a similar guide post 24 attached to a downwardly offset portion 25 of the upright 10 engages in a tubular socket member 26 attached to the clamping member 1. The posts 22 and 24 are disengaged from their guide sockets at the same time that the post 16 is disengaged from the bushing 20 to allow the upper clamping member to swing rearwardly with the guide member 14 and shaft 13 to the position shown in Fig. 3. Suitable means such as a handle 27 is provided for turning the actuating shaft 13.

In order to hold the post 16 against sliding movements in the guide member 14 after the upper clamping member has been disengaged from the stationary vertical guides, the post 16 is provided at the front thereof with a V-notch 28 that is engaged by a ball detent 29 pressed into engagement with the post 16 by a spring 30 when the post 16 reaches its uppermost limit of movement in the guide member 14. The detent 29 locks the upper clamping member against movement by gravity and causes the upper clamping member to swing with the shaft to the forward limit of movement where the guide members are in vertical alinement. When the upper clamping member is in the position shown in Fig. 3, counter-clockwise turning movement of the shaft 13 viewed as shown in Fig. 3 will first cause the guide member 14, post 16 and clamping member 1 to swing as a unit to the vertical position, after which further turning movement of the shaft 13 will exert a downward thrust on the post 16, causing the detent 29 to be forced out of the recess 28 as the post 16 moves downwardly into engagement with the bushing 20.

In order to permit the necessary swinging movement the bottom of the guide 14 is spaced above the bottom of the channel 8 when the guide post 16 is in vertical position and the forward swinging movement of the guide member 14 is limited by a pair of stop pins 31 secured in the bottom of the channel 8 adjacent the front face 7, the stop pins 31 being so positioned that the guide posts 16, 22 and 24 are alined with their guide sockets when the bottom of the guide member 14 engages the pins. The rearward movement of the upper clamping member may be limited by engagement of the guide member 14 with the bottom of the channel 8. As herein shown, the rear lower corner of the guide member 14 is cut away as shown at 32 to provide a stop face for engagement with the flat bottom of the channel 8. Since the vertical face 7 of the upright portion 6 may serve as a positioning means for the workpiece, the guide member 14 is so positioned that its forward face is to the rear of the face 7 in all of its positions of adjustment. As herein shown, the lower front corner of the guide member is cut away as shown at 33, so that no portion of the forward face of the guide member 14 will project past the face 7 during the swinging movements of the guide member.

Figures 7, 8, 9:
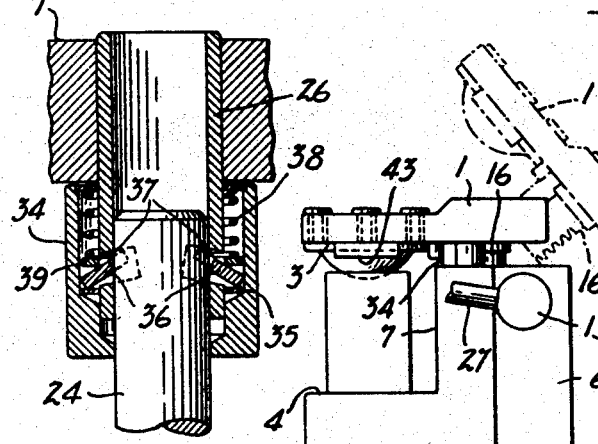
Fig. 7 is a fragmentary section taken on the line indicated at 7—7 in Fig. 5.
Fig. 8 is a side elevation showing the clamp provided with an adapter that supports and positions the work on the top clamping member.
Fig. 9 is a side elevation showing the clamp provided with an adapter for locating the work on the front face of the upright portion of the lower clamping member.

When a rack and gear is employed for operating a clamp it is desirable, as is well understood in the art, that a lock be provided either on the actuating shaft or on one or more of the guide members for returning the clamping members in their various clamping positions. As herein shown, a lock is provided for engagement with the guide post 24. As shown in Fig. 7, a lock carrying sleeve 34 is mounted for limited sliding movement on the tubular socket member 26, the sleeve 34 having an internal annular shoulder 35 that provides pivotal seats for detents 36 that project through slots 37 in the tubular member 26 and that have arcuate inner edges engageable with the post 24. The detents 36 are disposed at an inclination to the post 24 and are inclined upwardly from the seats 35 so that their inner ends are spread apart when the post is inserted into the socket and bite into the post upon downward movement of the post in the socket. The detents 36 are pressed toward their locking position by a spring 38 pressing against the ring 39 bearing against the top faces of the detents. Upward movement of the upper clamping member from its clamping position is resisted by the detents 36 but a lifting force can be exerted by the gear 19 on the rack 18 that will rock the detents out of their locking position and permit movement of the clamping member.

The upper clamping member 1 may be provided with a suitable number of guide bushings such as the guide bushing 40 shown in Figs. 1 and 2 to guide one or more drill bits 41 for drilling a workpiece properly positioned in the clamp below the bushing. The work may be positioned by means of an adapter mounted on the clamping face 4, by an adapter mounted on the clamping face 3, or by an adapter on the positioning face 7. As shown in Figs. 1 to 3, an adapter 42 is provided on the clamping face 4, as shown in Fig. 8, an adapter 43 is provided on the clamping face 3 and as shown in Fig. 9, an adapter 44 is provided on the positioning face 7. In each instance the adapter serves to accurately position the work with respect to a drill or the like guided in the upper clamping member.

By moving the upper clamping member to a position laterally clear of the lower clamping face 4, the workpiece to be operated upon can be conveniently positioned with respect to the clamping members. In some instances a tool such as a tap or reamer may be employed to tap or ream a hole previously drilled in the workpiece and such operations can be performed on the workpiece while it is still mounted upon the lower clamping member after the upper clamping member has been swung to a position clear of the work.

Figure 11:
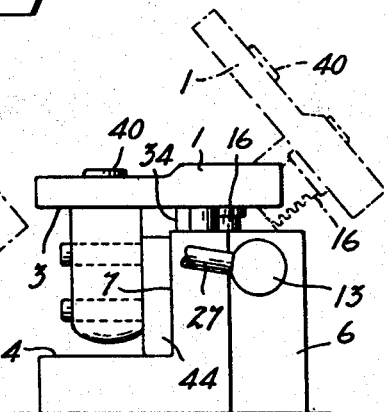
Fig. 11 is an end elevation of the clamp shown in Fig. 10.
Figure 10:
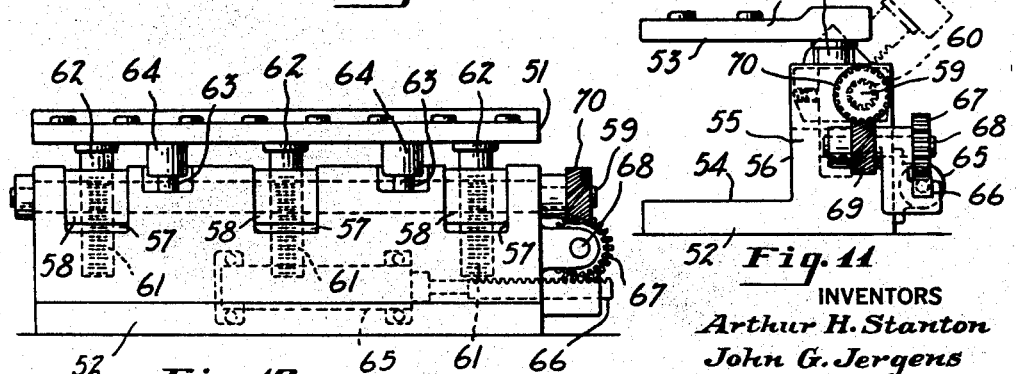
Fig. 10 is a front elevation showing the invention applied to an elongated clamp provided with a series of spaced guides and actuating racks.

The clamp of the present invention can be advantageously used for clamping elongated workpieces and workpieces of considerable weight. As shown in Figs. 10 and 11, the clamp may be provided with elongated upper and lower clamping members 51 and 52 provided with upper and lower clamping faces 53 and 54 disposed substantially as in the clamp previously described. The lower clamping member has an upright portion 55 extending the full length thereof which has a front positioning face 56 similar to the positioning face 7 in the clamp first described. A series of rectangular channels 57 are provided in the upright portion 55 and these channels receive guide blocks 58 which may be the same in construction as the guide member 14. A horizontal actuating shaft 59 extends the full length of the upright portion 55 and across all of the channels 57, the shaft 59 having gears 60 thereon that mesh with racks 61 on vertical guide posts 62 attached to the upper clamping member 51. Guide posts 63 on the upright portion 55 extend into locking sleeves 64 attached to the upper clamping member, the posts 63 and sleeves 64 corresponding to the post 24 and sleeves 34 in the clamp first described. Actuation of the shaft 59 lifts the upper clamping member 51 and swings the same rearwardly to the position indicated in dotted lines in Fig. 11 in the same way that the shaft 13 actuates the clamping member 1 in the clamp first described.

If the upper clamping member is too heavy for convenient manual actuation, a suitable power actuator may be provided such as a fluid pressure operated cylinder 65 which actuates a horizontal rack 66 that meshes with a gear 67 on a shaft 68 which carries a spiral gear 69 that meshes with a spiral gear 70 on the shaft 59. The stroke of the piston of the cylinder 65 will be that required to impart the turning movement to the shaft 59 that is required to impart the vertical and swinging movements to the upper clamping member.

Where heavy workpieces are being operated upon, the clamp of the present invention greatly facilitates the placing of the workpiece in the clamp, since the upper clamping member when swung to its rearmost position does not interfere with the use of a chain hoist or other mechanism for lifting the workpiece and positioning it in the clamp.

It is to be understood that in accordance with the provisions of the patent statutes, variations and modifications of the specific devices herein shown and described may be made without departing from the spirit of the invention.

What we claim is:

1. A work holding clamp comprising upper and lower clamping members having opposed clamping faces, a vertical guide member carried by one of said clamping members and movable into and out of a guide socket in the other of said clamping members to constrain said clamping members to relative linear up and down movements while said clamping members are separated less than a predetermined distance, an actuating shaft, means operated by said shaft for imparting relative movements to said clamping members to clamp the work or to separate the same a distance sufficient to disengage said guide member from said guide socket, and means for locking said upper clamping member to said shaft to cause said member to swing about the axis of said shaft to a position laterally clear of the lower clamping face after said guide member has been disengaged from said socket and to swing back to clamping position upon a reverse turning movement of the shaft.

2. A work holding clamp comprising a lower clamping member having a portion forming a lower clamping face and a pair of laterally spaced upright portions rearwardly of said clamping face, an upper clamping member having a clamping face overlying the clamping face of said lower clamping member and a downwardly extending post attached thereto rearwardly of its clamping face that has a longitudinal rack on its rear side, a horizontal shaft journaled in said upright portions, a guide member slidably receiving said post and pivoted on said shaft, a gear on said shaft in mesh with said rack, guiding means for constraining said members to relative linear movement while said members are separated less than a predetermined distance comprising a guide member carried by one of said clamping members that is movable into and out of a socket in the other of said clamping members, means for turning said gear in one direction to move said upper clamping member to clamping position or in the opposite direction to raise the same far enough to disengage said guide member from its socket, and means operable after said guide member is disengaged from its socket to lock said post against further upward movement in said pivoted guide member and cause said upper clamping member to swing rearwardly with said gear upon continued movement thereof in said opposite direction.

3. A work holding clamp according to claim 2 in which means is provided for stopping the forward movement of said pivoted guide member at a point where the guide member is alined with its socket.

4. A work holding clamp according to claim 2 in which means is provided for releasably holding the post against sliding movements in the pivoted guide member during swinging movements of said guide member.

5. A work holding clamp according to claim 2 in which means is provided for locking said upper clamping member in clamping positions.

6. A work holding clamp according to claim 2 in which the guiding means includes laterally spaced guide members and sockets.

7. A work holding clamp according to claim 6 in which locking means is provided in one of the guide sockets for engagement with the guide member that slides in said socket to lock the upper clamping member in various positions of vertical adjustment.

8. A work holding clamp comprising a lower clamping member having a base portion with a clamping face, a pair of spaced upright portions rearwardly of said clamping face and a vertically disposed upwardly opening guide socket between said upright portions, an upper clamping member having a clamping face overlying the clamping face of said lower clamping member and a vertical post rearwardly of its clamping face that slidably fits in said socket and that has a longitudinally extending rack on its rear side, a horizontal shaft journaled in said uprights, a gear on said shaft that meshes with said rack, a guide member pivoted to said shaft and slidably receiving said post, means for turning said gear to move said upper clamping member to clamping position and to raise said upper clamping member far enough to free said post from said socket, and means operable after said post is freed from said socket to lock said post against further upward movement in said pivoted guide member and cause said guide post and upper clamping member to swing with said gear to a position rearwardly of the clamping face of the bottom clamping member upon further continued movement of said shaft.

9. A work holding clamp comprising a lower clamping member having an upright rear portion and a base portion providing a lower clamping face extending forwardly from said upright portion, a rectangular channel extending through said upright portion from front to rear to provide spaced uprights with opposed parallel inner faces, a horizontal shaft at right angles to said faces and journaled in said uprights, a guide member pivotally mounted on said shaft and fitting between the inner side faces of said uprights, an upper clamping member having a clamping face overlying said lower clamping face, a post attached to said upper clamping member rearwardly of its clamping face and slidably fitting in said pivoted guide member forwardly of said shaft, said post having a longitudinal rack on its rear side, a gear on said shaft meshing with said rack, means for guiding said upper clamping member for linear movement toward and away from said lower clamping member comprising a guide member attached to one of said clamping members and movable into and out of a guide socket in the other of the clamping members, means for turning said gear in one direction to move said upper clamping member into clamping position and in the opposite direction to lift said upper clamping member far enough to free said attached guide member from its socket, and means operable after said guide member is released from its socket to stop further upward movement of said post in said pivoted guide member and cause the said guide member and upper clamping member to swing rearwardly with said gear upon further turning movement thereof in said opposite direction.

10. A work holding clamp according to claim 9 in which a spring pressed detent carried by said pivoted guide engages a notch in said post to releasably hold said post against sliding movement in said pivoted guide when the guide member and socket carried by said clamping member are disengaged.

11. A work holding clamp according to claim 9 in which the pivoted guide member is positioned wholly to the rear of the front face of the upright portion of the lower clamping member in all of its positions.

12. A work holding clamp according to claim 9 in which the pivoted guide member and the lower clamping member have portions that engage to limit the forward swinging movement to the upper clamping member at a position where the guide member carried by one clamping member is alined with the socket carried by the other and portions that engage to limit the rearward swinging movement of the upper clamping member at a position where it is positioned rearwardly of the lower clamping face.

13. A work holding clamp according to claim 9 in which the guiding means includes a socket in the lower clamping member into which the post of the upper clamping member is movable and separable guide members and sockets carried by said uprights and the upper clamping member.

14. A work holding clamp comprising a pair of relatively movable clamping members having opposed clamping faces, disengageable guiding means for constraining said members to relative linear closing and separating movements while said clamping faces are separated less than a predetermined distance, an actuating shaft transverse to the direction of said linear movements, means operated by said shaft for imparting relative closing movements to clamp the work and relative separating movements to separate said clamping members a distance greater than said predetermined distance and to disengage said guiding means, and means responsive to a predetermined separating movement for automatically connecting one of said clamping members to said shaft to turn therewith about the shaft axis to a position laterally clear of the clamping face of the other of said clamping members after disengagement of said guiding means.

References Cited in the file of this patent

UNITED STATES PATENTS 2,414,347     Woerner _____ Jan. 14, 1957